March 1, 1960 G. BETHMANN 2,926,574
FILM WINDING MECHANISM FOR CAMERAS
Filed March 7, 1958
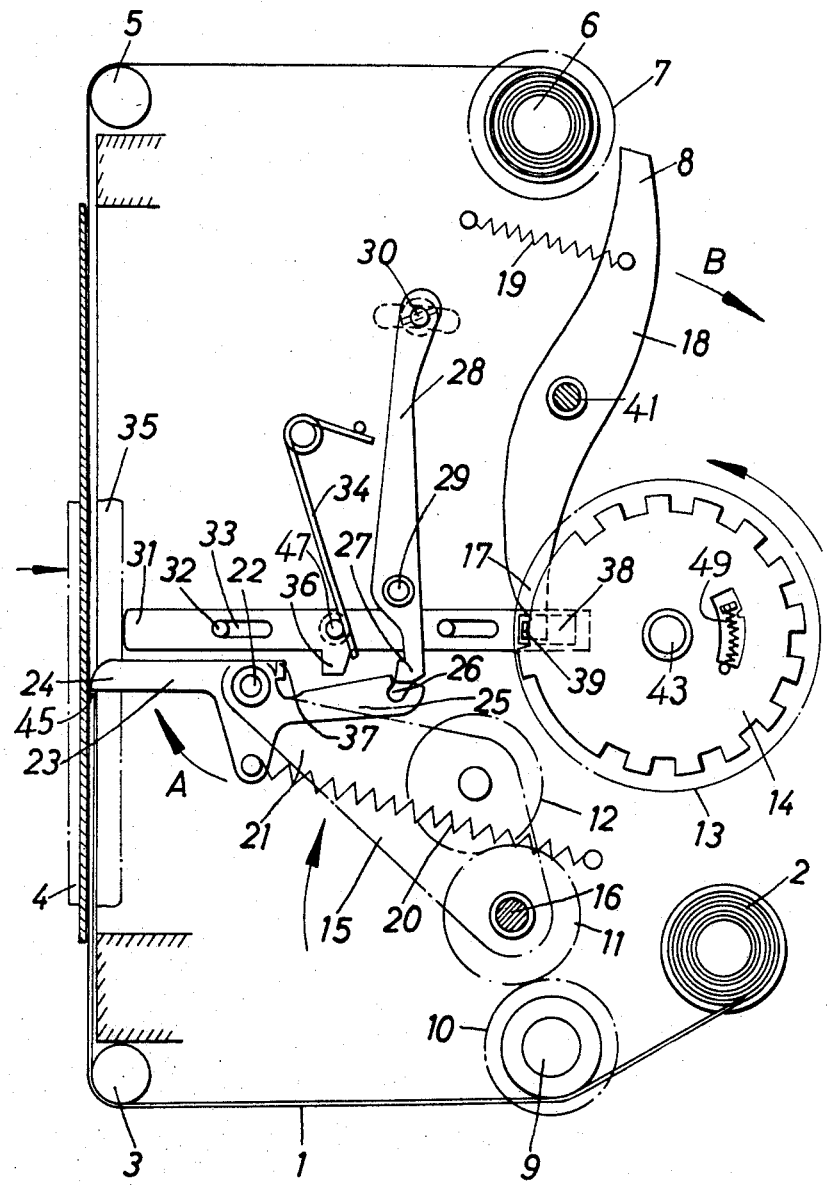

United States Patent Office 2,926,574
Patented Mar. 1, 1960

2,926,574

FILM WINDING MECHANISM FOR CAMERAS

Gustav Bethmann, Braunschweig, Germany, assignor to Franke & Heidecke, Fabrik Photographischer Präzisions-Apparate, Braunschweig, Germany, a firm Application March 7, 1958, Serial No. 719,918

Claims priority, application Germany March 9, 1957

9 Claims. (Cl. 95—31)

This invention relates to film winding mechanism for roll film cameras, particularly cameras of the kind sometimes referred to as "automatic" cameras, in which, after loading the camera with a fresh roll of film, the operator feeds the film to the initial exposure position (first frame position) simply by turning a crank or other rotary member until the rotary member becomes locked and cannot turn any further, so that the operator does not have to watch the appearance of a numeral or mark through an observation window, or anything of that kind.

Such cameras in general are already known, an example thereof being disclosed in U.S. Patent 2,016,611, granted October 8, 1935, on the application of Muller. An object of the present invention is to provide a generally improved and more satisfactory construction of this kind.

Another object is the provision of a construction for determining the first exposure position or first frame position automatically, which is considerably simplified, more reliable, and less expensive to construct, than the comparable structures in the prior art.

These and other desirable objects may be attained in the manner disclosed as an illustrative embodiment of the invention in the following description and in the accompanying drawing, which represents a diagrammatic or schematic longitudinal vertical section through the camera near the right hand side wall thereof.

The present invention is illustrated, by way of example, as applied to a twin lens reflex camera such as the well-known "Rolleiflex" camera, manufactured by the firm of Franke & Heidecke, of Braunschweig, Germany, and widely used throughout the United States and elsewhere. The following description presupposes that the reader is familiar with the construction of "Rolleiflex" cameras. Those who are not already familiar with such construction, may obtain detailed information by consulting the book "Rollei Photography, Handbook of the Rolleiflex and Rolleicord Cameras," by Jacob Deschin, published in 1952 by the Camera Craft Publishing Company of San Francisco, California.

Referring now to the diagrammatic or schematic drawing, the film 1 travels from the usual supply spool 2 over the guide roller 3, and thence upwardly over the focal plane portion or exposure area portion of the plate 4, which may be a part of the hinged back structure of the camera body. Thence it travels over another guide roller 5, and forwardly to the usual take-up spool 6 which is turned by conventional driving means not shown here but which may be, for example, similar at least in a general way to the take-up spool driving means disclosed in the above mentioned Muller Patent 2,016,611, or in Muller and Priesemann Patent 2,148,636, dated February 28, 1939. The winding of film onto the take-up spool is accomplished by turning a knob or, preferably, the usual hand crank customarily found on the right hand side wall of a "Rolleiflex" camera. The winding mechanism includes a ratchet wheel 7 in position to be engaged and stopped or locked by the upper end 8 of a locking lever or pawl 18 pivoted on a pivot 41 on the camera body and urged in a locking direction by the spring 19.

As the film unwinds from the supply roll 2 and is wound up on the take-up spool 6, it travels over a film metering roller 9 and causes the same to turn. This metering roller 9 is coupled as by means of toothed gearing 10, 11, and 12, with a gear wheel 13 mounted on a pivot or axle 43 on the camera body, and rigidly connected to a notched cam disk 14. For convenience and simplicity of illustration, the gears 10, 11, 12, and 13 are shown only by broken circles representing the pitch circles of the respective gears, but it will be understood that these gears actually do have gear teeth extending around their circumferences, the teeth of the respective adjacent gears meshing with each other. Similarly for convenience and simplicity of illustration, the ratchet 7 has been illustrated merely by a broken circular line, but it actually has ratchet teeth extending all the way around its circumference.

The gear 12 is mounted on a swinging plate 15 which oscillates or swivels on the shaft 16 of the gear 11. When the plate 15 is swung leftwardly or counterclockwise (when viewed as in the drawing) to the position illustrated, it carries the gear 12 away from and out of mesh with the gear 13. When the plate 15 is swung clockwise from the illustrated position, the gear 12 is brought into mesh with the gear 13. The sizes of the gears are so chosen that, when the gear 12 is in mesh with the gear 13, the gear 13 and its connected disk 14 are turned through the space from one notch to the next notch of the disk 14, by rotation of the metering roller 9 when the film is advanced through the length of one frame or one exposure area plus the desired small amount of separation between exposure areas. The lower end 17 of the locking lever 18 has a lateral projection 39 which rides on the periphery of the notched cam disk 14 in such position that whenever a notch of the cam disk comes opposite the lateral ear 39 of the locking lever, this ear can drop into the notch under the influence of the spring 19, thus allowing the upper end 8 of the locking lever to swing into engagement with the teeth of the ratchet 7 to lock the ratchet against further turning movement until the locking lever 18 is displaced to an unlocked position.

The above mentioned swinging plate 15, on which the gear 12 is mounted, is urged by a spring 20 in a clockwise direction when viewed as in the drawing; that is, in a direction to carry the gear 12 into meshing engagement with the gear 13. The upper left hand free end 21 of the swinging plate 15 carries a stud 22 on which is pivotally mounted a triple armed lever 23. A short downwardly extending arm on this lever 23 is connected to the spring 20, as shown, so that the spring constantly tends to swing the lever 23 in a counterclockwise direction on its pivot 22, as well as swing the plate 15, 21 in a clockwise direction on its pivot 16. A second or rearwardly extending arm 24 of this lever 23 projects approximately horizontally rearwardly to a position close to the film 1, near one edge thereof, adjacent the exposure area or focal plane of the camera. The third arm 25 of the lever 23 extends approximately horizontally forwardly from the pivot 22, and has near its forward end a notch or recess 26 to engage with an abutment 27 which is stationary on the camera body, during normal operation, but which, for purposes of fine adjustment, is formed on the lower end of an adjusting lever 28 pivoted on the camera body at 29 and having an upper end held in any desired position within a limited range of adjustment by means of a screw 30 which clamps a portion of the upper end relative to an arcuate slot concentric with the pivot 29. The upper end of the adjusting lever 28, above the pivot 29, is much longer than the lower end which carries the abutment 27, so that a very fine adjustment of the position of the lower end is obtained by moving and re-clamping the upper end of the lever.

The film used in this camera is the usual paper-backed roll film which, as well known, is made up of the photographic film itself plus an opaque backing strip of paper which is longer than the photographic film so as to provide a leader portion which may be threaded through the camera and attached to the take-up spool before the film itself begins to unroll from the supply spool, thus avoiding accidental exposure or fogging of the film while a fresh supply is being loaded into the camera. The film itself is at least as thick as the backing paper, and in most cases is substantially thicker than the backing paper. The combined thickness of the film and backing paper is shown in the drawing by a double line, whereas the thickness of the backing paper alone (i.e., the advance or leader part thereof, where no film is present) is shown by a single line.

The engagement of the notch or recess 26 of the lever 23 with the stationary abutment 27, holds the lever 23 against forward movement (that is, against rightward movement when viewed as in the drawing) and thus maintains the gear 12 out of engagement with the gear 13. The position of the lever 28 is so adjusted that when the abutment portion 27 is engaged in the notch 26, the rear end 24 of the lever 23 is very close to the back plate 4 over which the film 1 travels, with enough space for passage of the paper leader strip of the film itself, but not enough space for free passage of the combined thickness of the paper strip and the film. Therefore, as the advancing end 45 of the film travels upwardly along the plate 4, the extra thickness of the film (aided also by the extra thickness of the usual adhesive patch which connects the advancing end of the film to the backing paper) hits against the rear end 24 of the lever 23 and "trips" this lever, moving it slightly in a clockwise direction on its pivot 22, against the force of the spring 20. This immediately releases the forward end 25 of the lever from the abutment 27, the forward end swinging slightly downwardly so that the notch 26 becomes disengaged from the abutment 27. Then the upper surface of the forward arm 25 of the lever slides along underneath the abutment 27 as the spring 20 pulls the lever 23 rightwardly or forwardly, thus swinging the plate 15, 21 in a clockwise direction on its pivot 16 so that the gear 12 is brought into meshing engagement with the gear 13.

Previous to the tripping of the lever 23 by the advancing edge of the film, the gear 13 and notched disk 14 were in an initial starting position to which they had been returned by known means (e.g., a spring) when the fresh spool of film was loaded into the camera. The lateral projection or ear 39 on the lever 17, 18 had been resting on a smooth portion of the periphery of the notched cam disk 14. The parts 13 and 14 had remained in this position during the initial part of the first film feeding operation, because the gears 12 and 13 were out of mesh with each other, so that the rotation of the metering roller 9 during the initial part of the film winding movement has not caused any rotation of the gear 13 and disk 14 from the initial rest position. However, as soon as the advancing end of the film hits and trips the rear end 24 of the lever 23, this brings the gear 12 into mesh with the gear 13, as above explained. From this point onward, the advancing feeding movement of the film is transmitted, by the rotation of the metering roller 9, to the gear 13, turning this gear and its notched disk 14. The space or peripheral interval on the disk 14, from the initial starting position to the position where the first notch comes opposite the ear or lug 39 of the locking lever 18, is of such length that when the film reaches the proper position for the first exposure, the ear 39 drops into the first notch of the disk, thereby locking the ratchet 7 so that further winding movement of the film must stop.

From then on until the last exposure is made, the further film feeding movements are performed in the usual manner already known, so that no special description is needed. When the shutter of the camera is tripped to make an exposure, the known mechanism simultaneously moves the ear 39 of the locking lever out of the notch in the disk 14 and temporarily holds it out of the notch, so that the locking end 8 of the pawl is disengaged from the ratchet 7. Another film feeding movement can now take place (e.g., by rotation of the usual hand crank) and when the film has been fed forwardly by the correct amount as determined by rotation of the metering roller 9 and consequent rotation of the gear 13, the next notch of the disk 14 comes opposite the ear 39 of the locking pawl, which drops into this next notch, thereby locking the feeding mechanism against further rotation until another exposure is made. Then when an exposure is made, the pawl 8 is once more unlocked, so that another feeding operation can be performed, and this process is repeated time after time until all of the available exposures on the film have been made.

In order to bring the parts to the desired initial position when a fresh supply of film is loaded into the camera, there is a slide member 31 mounted at one side of the camera to slide horizontally forwardly and rearwardly on pins 32 which extend through slots 33 in the slide member.

A spring 34, engaging a pin 47 on the slide 31, tends to move the slide in a rearward direction and keeps the rear end thereof engaged with a portion 35 of the hinged camera back member, when the back is closed. The closed position of the camera back maintains the slide 31 at the forward limit of its motion, which is the position illustrated in the drawing. However, when the camera back is opened to remove the exposed roll of film and to insert a fresh roll of unexposed film, the spring 34 is able to move the slide 31 rearwardly, so that a projection 36 on this slide engages a projection 37 on the triple-armed lever 23, and moves this lever rearwardly to its starting position where the forward end thereof becomes latched on the abutment 27. This of course carries the plate 15, 21 rearwardly or counterclockwise to its initial starting position illustrated. The slide member also has an opening 38 through which the above mentioned ear 39 on the locking pawl extends, so that when the slide member moves rearwardly (upon the camera back being opened) the forward end of the recess 38 engages the ear 39 and moves the ear and the lower end of the locking lever rearwardly, disengaging the ear 39 from the notches of the disk 14 and disengaging the pawl end 8 from the teeth of the ratchet 7. As a result of the disengagement of the gear 12 from the gear 13, and the disengagement of the ear 39 from the disk 14, the usual spring (not shown) is able to return the gear 13 and disk 14 to their initial starting position, in known manner.

The lever 23 has been sometimes referred to above as a three-armed or triple-armed lever, because it has the rear arm 24, the forward arm 25, and also the downwardly extending arm to which the spring 20 is secured. However, it may also be conveniently referred to as a two-armed lever or double-armed lever, since it has two principal arms 24 and 25.

The manner in which the operation of the camera shutter moves the pawl lever 18 out of one of the notches in the disk 14 and holds it temporarily out of the notch until the next feeding operation begins, is well known and need not be specifically illustrated here. The means for holding the ear 39 temporarily out of the notches of the disk 14 until the next feeding operation is started, preferably includes the usual second notched disk alongside the disk 14, mounted for slight rotation relative to the disk 14 so that the notches of one disk are at least partly out of registry with the notches of the other disk during the desired holding period, one of the notched disks being turned relative to the other by the influence of a small spring 49. For such an arrangement of two notched disks, although in a somewhat different environment, but sufficient nevertheless to illustrate to those skilled in the art how a double notched disk arrangement would serve the desired purpose in the present environment, see German Patent 727,352 of Franke & Heidecke.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

The disk 14 (or some other disk connected to and turning with it) preferably carries the usual film frame numbers, successively visible through an observation window in the side wall of the camera. A disk like the disk 14 is sometimes known in this art as a film metering member, but in the present instance it may be referred to as a film counting member or film winding member, to avoid confusion with the nomenclature of the member 9 which has been called the film metering roller.

What is claimed is:

1. A roll film camera of the type using a film strip structure having a leader portion of one thickness and an exposure area portion of greater thickness, comprising a camera body having a back movable between closed and open positions, means for holding a supply roll of film, means for holding a take-up roll to which film is advanced from said supply roll, a film metering member bearing against and rotated by feeding movement of the film, and a rotary film frame counting member, characterized by disengagable gearing for driving said counting member from said metering member, spring means tending to engage said gearing in driving relation, a latch for holding said gearing in disengaged position against the force of said spring means, and a feeler lever member having one end lying closely adjacent said film strip structure in position to allow free passage of said leader portion out of contact therewith and to be engaged and pivoted by said exposure area portion of greater thickness, said feeler member being operatively connected at another end to said latch to release said latch when said feeler member is pivoted by said portion of greater thickness, so that said counting member will begin to be driven by said metering member when the advancing portion of greater thickness arrives at and pivots said feeler member.

2. A roll film camera of the type using a film strip structure having a leader portion of one thickness and an exposure area portion of greater thickness, comprising a camera body having a back movable between closed and open positions, means for holding a supply roll of film, means for holding a take-up roll to which film is advanced from said supply roll, a film metering member bearing against and rotated by feeding movement of the film, and a rotary film frame counting member, characterized by disengageable gearing for driving said counting member from said metering member, spring means tending to engage said gearing in driving relation, a latch for holding said gearing in disengaged position against the force of said spring means, a feeler lever member having one end lying closely adjacent said film strip structure in position to allow free passage of said leader portion out of contact therewith and to be engaged and pivoted by said exposure area portion of greater thickness, said feeler member being operatively connected at another end to said latch to release said latch when said feeler member is pivoted by said portion of greater thickness, so that said counting member will begin to be driven by said metering member when the advancing portion of greater thickness arrives at and pivots said feeler member, and means controlled by movement of said camera back to open position for disengaging said gearing and for restoring said latch to latching position.

3. A construction as defined in claim 1, in which movement of said gearing from disengaged position to engaged position serves also to move said feeler member from a position closely adjacent said film strip structure to a position substantially removed therefrom.

4. A roll film camera of the type using film having a relatively thin leader portion and a thicker structure at the junction between said leader portion and an exposure portion, said camera including a body, means for advancing film from a supply roll to a take-up roll, a locking pawl for said film advancing means, a notched rotary disk for controlling said pawl, said pawl having a first portion bearing upon said disk and adapted to enter a notch thereof when such notch comes opposite said first portion and having a second portion effective to lock said film advancing means when said first portion enters a notch of said disk, a rotary member contacting with and turned by advancing movement of said film, disengageable gearing for turning said notched disk from turning movement of said rotary member, means tending to move said gearing to engaged driving position, and a latch for holding said gearing in disengaged position, characterized by a resiliently mounted lever having one end extending toward the path of travel of the film to a position close to but out of contact with the thin leader portion of the film and in position to be engaged and moved in the direction of travel of the film by said thicker structure, and means operated by such movement of said lever for releasing said latch so that said gearing may move to engaged driving position.

5. A roll film camera of the type using film having a relatively thin leader portion and a thicker structure at the junction between said leader portion and an exposure portion, said camera including a body, means for advancing film from a supply roll to a take-up roll, a locking pawl for said film advancing means, a notched rotary disk for controlling said pawl, said pawl having a first portion bearing upon said disk and adapted to enter a notch thereof when such notch comes opposite said first portion and having a second portion effective to lock said film advancing means when said first portion enters a notch of said disk, a rotary member contacting with and turned by advancing movement of said film, disengageable gearing for turning said notched disk from turning movement of said rotary member, said disengageable gearing including a plate mounted for oscillation and a gear rotatably mounted on said plate for rotation about an axis offset from the axis of oscillation of said plate so that oscillation of said plate moves said gear bodily between a position in which said gearing is disengaged and a postion in which said gearing is effectively engaged, spring means tending to urge said disengageable gearing toward said effectively engaged position, a lever pivotally mounted on said plate to turn relative thereto and also to move bodily therewith when said plate oscillates, said lever having a first arm engaging a latching abutment on said camera body to constitute a latch for holding said plate in a position in which said gearing is disengaged and having a second arm in position to be engaged and displaced by advancing movement of said thicker structure of said film, displacement of said second arm moving said first arm of said lever relative to said abutment to release said latch so that said plate may move to a position in which said gearing is engaged, so that further advancing movement of said film will cause said rotary member to turn said notched disk.

6. A construction as defined in claim 5, further including a second lever pivotally mounted on said camera body and having a long arm and a short arm, said latching abutment being on said short arm, and means for holding said long arm adjustably in fixed position relative to said camera body, to provide a fine adjustment of the position of said latching abutment.

7. A roll film camera of the type using film having a relatively thin leader portion and a thicker structure at the junction between said leader portion and an exposure portion, said camera including a body, means for advancing film from a supply roll to a take-up roll, a locking pawl for said film advancing means, a notched rotary disk for controlling said pawl, said pawl having a first portion bearing upon said disk and adapted to enter a notch thereof when such notch comes opposite said first portion and having a second portion effective to lock said film advancing means when said first portion enters a notch of said disk, a rotary member contacting with and turned by advancing movement of said film, disengageable gearing for turning said notched disk from turning movement of said rotary member, means tending to move said gearing to engaged driving position, a latch for holding said gearing in disengaged position, a feeler lever operatively connected to said latch and having an end close to said film in position to be engaged and pivoted by passage of said thicker structure of said film to release said latch so that said gearing may move to its engaged position, a camera back movable relative to said camera body between a closed position and an open position, and means controlled by opening movement of said camera back for concomitantly moving said gearing to disengaged position, restoring said latch to effective latched position, and removing said second portion of said locking pawl from said notched disk.

8. A roll film camera of the type using film having a relatively thin leader portion and a thicker structure at the junction between said leader portion and an exposure portion, said camera including a body, means for advancing film from a supply roll to a take-up roll, a locking pawl for said film advancing means, a notched rotary disk for controlling said pawl, said pawl having a first portion bearing upon said disk and adapted to enter a notch thereof when such notch comes opposite said first portion and having a second portion effective to lock said film advancing means when said first portion enters a notch of said disk, a rotary member contacting with and turned by advancing movement of said film, disengageable gearing for turning said notched disk from turning movement of said rotary member, means tending to move said gearing to engaged driving position, a latch for holding said gearing in disengaged position, a feeler lever operatively connected to said latch and having an end close to said film in position to be engaged and pivoted by passage of said thicker structure of said film to release said latch so that said gearing may move to its engaged position, a camera back movable relative to said camera body between a closed position and an open position, a slide member mounted for movement relative to said camera body in the direction of opening and closing movement of said camera back, spring means tending to move said slide member to a first position, said camera back when closed engaging said slide member and holding it in a second position, and means on said slide member for moving said gearing to disengaged position, restoring said latch to effective position, and removing said second portion of said locking pawl from said notched disk by movement of said slide member from its second position to its first position upon opening said camera back.

9. A roll film camera for film having a leader strip portion of one thickness and an exposure portion of greater thickness, said camera comprising a body, means for advancing film relative to a predetermined area of said body, a rotary metering member driven by advancing movement of the film, a film counting member, disengageable gearing for driving said counting member from said metering member, a shifter for moving said gearing between engaged position and disengaged position, a spring tending to move said gearing into engaged position, an abutment on said camera body, and a lever fulcrumed on said shifter to oscillate relative thereto and to move bodily therewith, said lever having one arm in latching engagement with said abutment to hold said lever and said shifter in a position in which said gearing is disengaged and having a second arm close to said film in position to be unaffected by advancing movement of said leader strip portion of said film and to be engaged and moved by advancing movement of the greater thickness portion of said film, to turn said lever on its fulcrum to disengage the first mentioned arm thereof from latching engagement with said abutment so that said spring may move said shifter to move said gearing into engaged position.

References Cited in the file of this patent

UNITED STATES PATENTS

| 2,539,764 | Wisegarver | Jan. 30, 1951 |

FOREIGN PATENTS

| 226,239 | Switzerland | July 1, 1943 |
| 1,114,789 | France | Dec. 19, 1955 |